No. 626,696.
W. H. HART, JR.
BICYCLE SUPPORT.
(Application filed Mar. 5, 1898.)
Patented June 13, 1899.
(No Model.)
2 Sheets—Sheet 1.
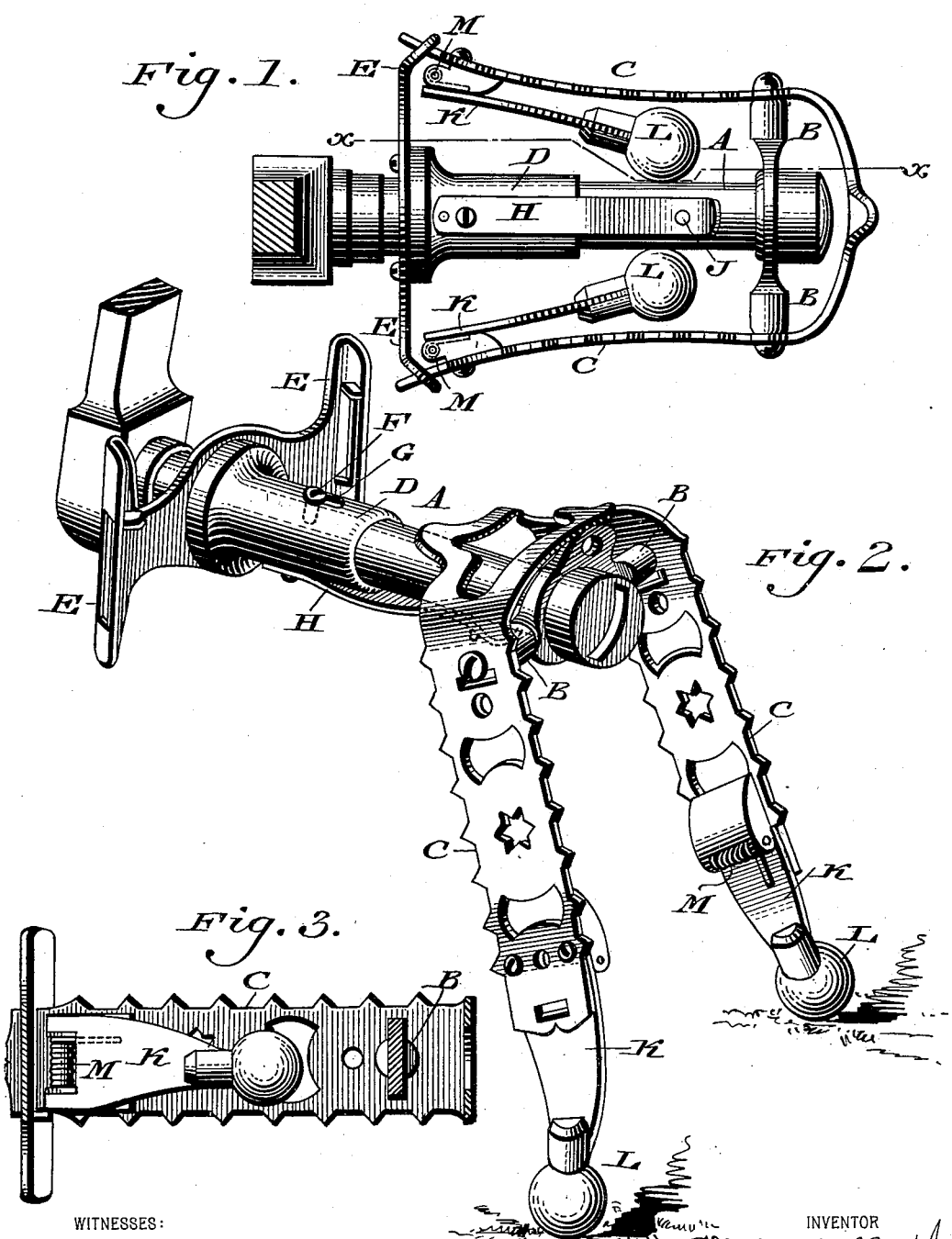
WITNESSES:
INVENTOR
William H. Hart Jr.
BY
ATTORNEYS No. 626,696. Patented June 13, 1899.
W. H. HART, Jr.
BICYCLE SUPPORT.
(Application filed Mar. 5, 1898.)
(No Model.) 2 Sheets—Sheet 2.
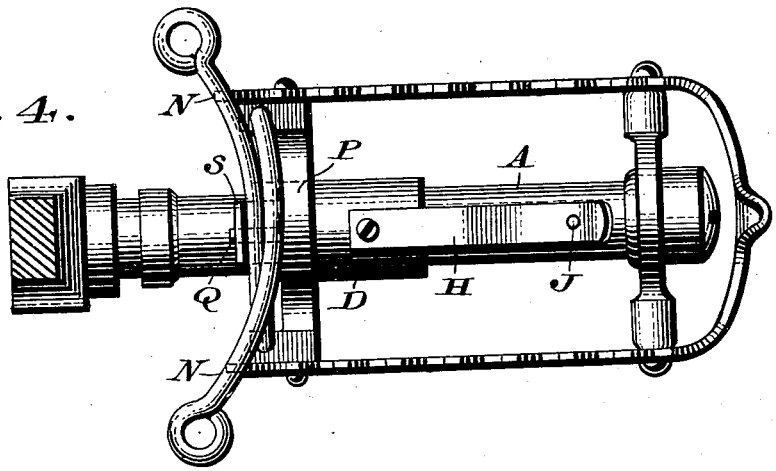
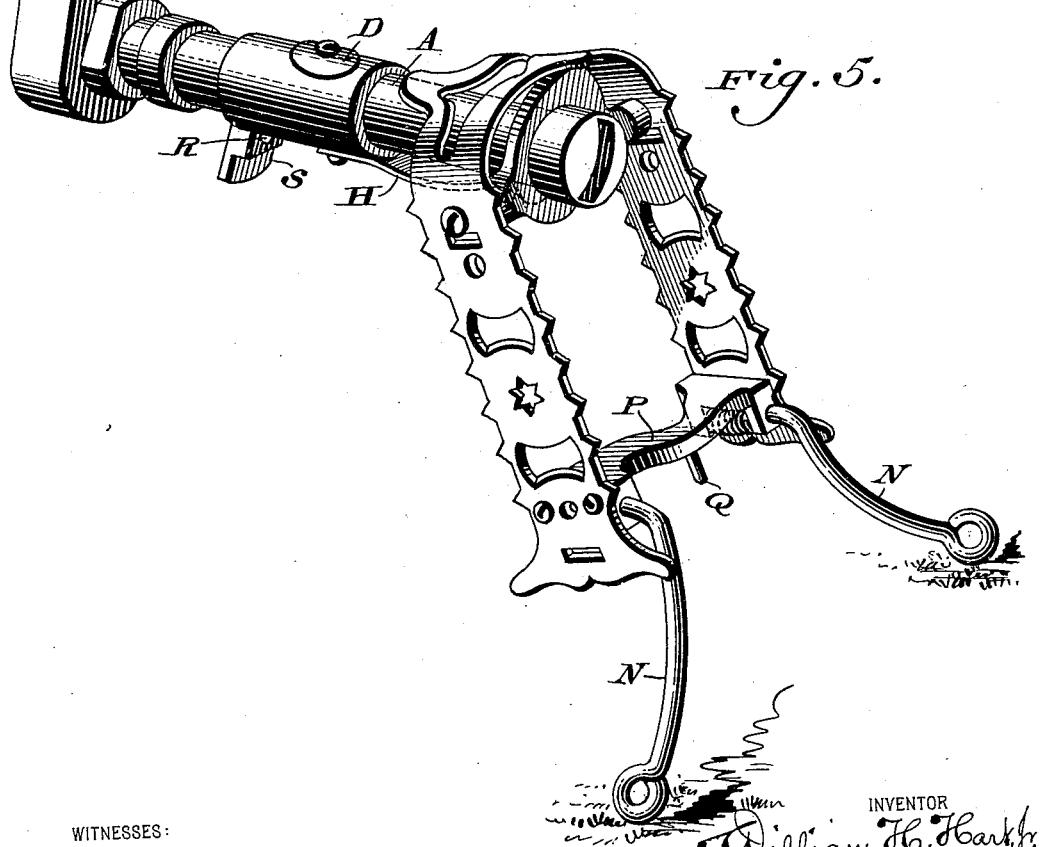
WITNESSES:
P. F. Eagle.
L. Douville.
INVENTOR
William H. Hart, Jr.
BY
Niedersheim & Fairbanks
ATTORNEYS
THE NORRIS PETERS CO., PHOTO-LITHO., WASHINGTON, D. C.

UNITED STATES PATENT OFFICE.

WILLIAM H. HART, JR., OF PHILADELPHIA, PENNSYLVANIA.

BICYCLE-SUPPORT.

SPECIFICATION forming part of Letters Patent No. 626,696, dated June 13, 1899.

Application filed March 5, 1898. Serial No. 672,659. (No model.)

*To all whom it may concern:*

Be it known that I, WILLIAM H. HART, Jr., a citizen of the United States, residing in the city and county of Philadelphia, State of Pennsylvania, have invented a new and useful Improvement in Bicycle-Supports, which improvement is fully set forth in the following specification and accompanying drawings.

My invention consists of a bicycle-pedal which is adapted to be converted into a bicycle-support and provided with means for increasing the length thereof, as will be hereinafter set forth, and pointed out in the claims that follow the specification.

Figure 1 represents a top or plan view of a bicycle-pedal embodying my invention. Fig. 2 represents a perspective view thereof. Fig. 3 represents a horizontal section on line $x$ $x$, Fig. 1. Fig. 4 represents a top or plan view of another form of my invention. Fig. 5 represents a perspective view thereof.

Similar letters of reference indicate corresponding parts in the figures.

Referring to the drawings, A designates the sleeve of a bicycle pedal-shaft, adapted to rock thereon as usual and having its outer end provided with the laterally-extending arms B as bearings for the pedal or pedal-frame C, which is thus adapted to be placed in operative position, as in Fig. 1, or swing outward and downwardly for the purpose of a support for a bicycle, as in Fig. 2.

On the sleeve A is the sliding collar D, with which is connected the ears E, which when the pedal-frame is in operative position receive the free ends of the side pieces of said pedal-frame, and thus prevent the unfolding of the latter. The collar is connected with the sleeve by means of the pin or screw F, which passes freely through the slot G in said collar and is secured to said sleeve. In order to control said collar, there is secured to the same the spring-plate H, which is provided with the pin or stud J, the latter entering an opening in said sleeve, thus locking the collar and preventing improper disengagement of the pedal-frame from the ears E.

Pivoted to the free ends of the side pieces of the pedal-frame are the legs K, which are provided with knobs or feet L and have bearing against them the springs M, which in the present case encircle the pivots or axes of said legs and have their ends in contact with the legs and side pieces of the pedal-frame, so that the tendency of said springs is to force out said legs into the position shown in Fig. 2, when the legs form extensions of the pedal-frame and lengthen the latter, so as to properly rest on the ground and thus support the bicycle. It will be seen that when the legs are folded on the side pieces of the pedal-frame the latter is turned on its axis on the bearings B, so as to be placed on the pedal-shaft in the operative position of a pedal, as shown in Fig. 1.

The collar D is moved outwardly, whereby the ears E engage with the adjacent ends of the side pieces of the pedal-frame, thus securing the same. The pin J springs into the opening in the sleeve A, and thus the collar D is locked or controlled, whereby the pedal-frame retains its position and may be operated as usual in such cases, it being noticed that the legs K remain folded between the pedal-frame and the shaft or collar thereof.

When it is desired to support the bicycle, the pin J is raised and the collar D shifted inwardly, or in the present case to the left, whereby the ears E are removed from the ends of the pedal-frame, the latter then being overturned and swung downwardly. The legs fly outwardly and increase the length of the pedal-frame, and thus a serviceable support is provided, as illustrated in Fig. 2. When the bicycle is again to be propelled, the legs are folded and the pedal-frame is restored to its normal position, after which the proper parts are engaged or locked, the result being as is evident on reference to Fig. 1.

In Figs. 4 and 5 I show the pedal-frame as provided with legs N, which are adapted to fold toward each other at the inner end of the pedal-frame when in operative position. In this case said end is provided with the crossbar P, from which projects the pin Q, the latter being adapted to enter the opening R of the ear S, which ear is connected with the collar D on the sleeve A, said collar carrying the spring or elastic plate H, on which is the pin or stud J, adapted to engage with the sleeve A, the same as in Fig. 1, it being noticed that the legs N are retained by the ear S, and thus controlled. (See Fig. 4.) When, however, the pin J is raised and the collar D moved, in the present case to the left, the pin Q is released, when the legs fly out and the pedal-frame may be overturned and swing downwardly, the result being the support for the bicycle, as shown in Fig. 5.

Having thus described my invention, what I claim as new, and desire to secure by Letters Patent, is—

1. The combination with a rotatable member of a pedal-shaft, of a swinging pedal-frame which is mounted on said member and adapted to be turned from a horizontal to a vertical, or comparatively vertical position, as a bicycle-support, a swinging leg mounted on the free end of said frame, and adapted to be folded on said frame, and means connected with said leg for automatically throwing out the same from its folded position and holding it as a downward continuation of said frame in the operative position of said support.

2. A pedal-frame having a pivoted connection with the rocking sleeve of a pedal-shaft whereby it may be turned from a horizontal to a vertical or comparatively vertical position as a bicycle-support, a leg pivotally connected with said frame whereby it may be folded on the same, and a spring bearing against said leg whereby the latter may be automatically thrown out from its folded position and controlled as a downward continuation of the pedal-frame.

3. A bicycle pedal-frame having a pivotal connection with the sleeve on the pedal-shaft, whereby it may be placed from a horizontal into a vertical or comparatively vertical position as a support for a bicycle, a swinging leg mounted on said frame, and a spring connected with said leg and frame for throwing out said leg and holding the same in operative position as a downward extension of said frame said leg and frame being adapted to be folded on the pedal-shaft.

4. A swinging pedal-frame, a sliding collar on the sleeve of the pedal-shaft, to which sleeve said frame is pivotally connected, an ear on said collar adapted to lock the said frame in horizontal position, a swinging leg hinged to said frame, and a spring connected with said leg and frame for automatically throwing out said leg and holding it in operative position as a downward continuation of the pedal-frame when converted into a support.

WILLIAM H. HART, JR.

Witnesses:
JOHN A. WIEDERSHEIM,
WM. C. WIEDERSHEIM.